US012700826B2

(12) United States Patent
Rakshit et al.

(10) Patent No.: US 12,700,826 B2
(45) Date of Patent: Aug. 4, 2026

(54) IOT ENABLED LASER-BASED POINTED CLEANING OF SOLAR PANEL

(71) Applicant: International Business Machines Corporation, Armonk, NY (US)

(72) Inventors: Sarbajit K. Rakshit, Kolkata (IN); Jagabondhu Hazra, Bangalore (IN); Manikandan Padmanaban, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 18/211,853

(22) Filed: Jun. 20, 2023

(65) Prior Publication Data

US 2024/0429857 A1 Dec. 26, 2024

(51) Int. Cl.
H02S 40/10 (2014.01)
B08B 7/00 (2006.01)
(Continued)

(52) U.S. Cl.
CPC ............ H02S 40/10 (2014.12); B08B 7/0042 (2013.01); B08B 13/00 (2013.01); B23K 26/046 (2013.01);
(Continued)

(58) Field of Classification Search
None
See application file for complete search history.

(56) References Cited

U.S. PATENT DOCUMENTS

| | | | |
|---|---|---|---|
| 10,968,562 B2 | 4/2021 | Clowes | |
| 2019/0351873 A1 | 11/2019 | Dalal | |
| 2021/0408967 A1* | 12/2021 | Anderegg | ............... F24S 40/20 |

FOREIGN PATENT DOCUMENTS

| | | | | |
|---|---|---|---|---|
| AU | 2019101254 A4 | 11/2019 | | |
| CN | 106623274 A | * 5/2017 | ............. | H02S 40/10 |

(Continued)

OTHER PUBLICATIONS

Machine translation: CN106623274; Wu et al. (Year: 2017).*
(Continued)

*Primary Examiner* — Natasha N Campbell
(74) *Attorney, Agent, or Firm* — Scully, Scott, Murphy & Presser, P.C.; Michael P. O'Keefe, Esq.

(57) ABSTRACT
A laser-based system and method for cleaning solar panels that have accumulate dirt or grime. The laser-based system employs methods for identifying optimum timing when the laser-based cleaning is to be performed. Otherwise, a selective cleaning will be performed on the solar panel. The method receives a combination of weather data, power output data, and solar image data to pin-point dust contours from the solar panel and removes the dust hotspots through pointed laser cleaning on accounting the tradeoff between the power consumed the by the laser and power gained from the cleaned solar panel. To achieve pin-pointed laser beam cleaning, the system adjusts the focal length of the laser beam. The method pin-points the removal of dust contours responsible for reduction in power output by analyzing weather, power output and time series images and optimally determines the region of interest to remove the dust hotspots through pointed laser cleaning.

11 Claims, 9 Drawing Sheets

_300_

(51) Int. Cl.

| | |
|---|---|
| *B08B 13/00* | (2006.01) |
| *B23K 26/046* | (2014.01) |
| *B23K 26/36* | (2014.01) |
| *F24S 40/20* | (2018.01) |
| *G05B 13/02* | (2006.01) |
| *G05B 13/04* | (2006.01) |
| *H02S 50/00* | (2014.01) |

(52) U.S. Cl.
CPC .............. *B23K 26/36* (2013.01); *F24S 40/20* (2018.05); *G05B 13/027* (2013.01); *G05B 13/048* (2013.01); *H02S 50/00* (2013.01)

(56) References Cited

FOREIGN PATENT DOCUMENTS

| | | |
|---|---|---|
| CN | 111682843 A | 9/2020 |
| CN | 113369250 A | 9/2021 |
| CN | 115138643 A | 10/2022 |
| CN | 115346139 A | 11/2022 |
| WO | WO-2020202116 A1 * | 10/2020 ............. B08B 3/024 |

OTHER PUBLICATIONS

Vasiljev, P., et al., "Ultrasonic system for solar panel cleaning", Sensors and Actuators A 200 (2013), Accepted Jan. 7, 2013, Available online Jan. 14, 2013, pp. 74-78.
Clean Solar Solutions, "Why Clean Solar Panels?", https://www.solar-panel-cleaners.com/why-clean-solar-panels/, Printed on Jun. 16, 2023, 8 pages.
Malewar, A., "Tesla patents a laser to clean the car windshield and solar panels", https://www.inceptivemind.com/tesla-patents-laser-clean-car-windshield-solar-panels/10681/, Dec. 9, 2016, 4 pages.
Chandler, D.L., "MIT's Clever Way To Clean Solar Panels Without Water", https://scitechdaily.com/mit-clever-way-to-clean-solar-panels-without-water/, Mar. 18, 2022, 8 pages.

* cited by examiner

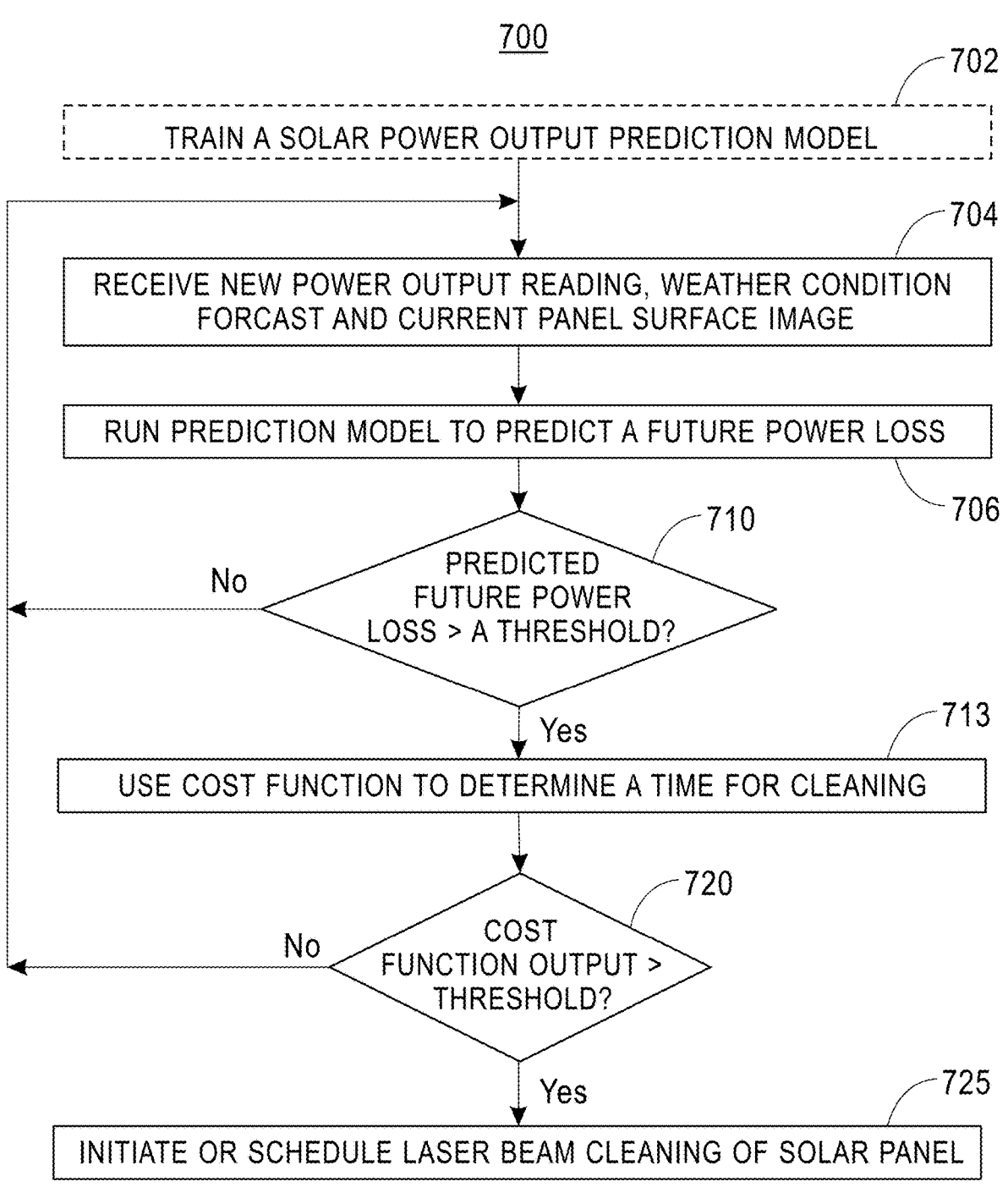

700

702

TRAIN A SOLAR POWER OUTPUT PREDICTION MODEL

704

RECEIVE NEW POWER OUTPUT READING, WEATHER CONDITION FORCAST AND CURRENT PANEL SURFACE IMAGE

RUN PREDICTION MODEL TO PREDICT A FUTURE POWER LOSS

706

710

PREDICTED FUTURE POWER LOSS > A THRESHOLD?

No

Yes

713

USE COST FUNCTION TO DETERMINE A TIME FOR CLEANING

720

COST FUNCTION OUTPUT > THRESHOLD?

No

Yes

725

INITIATE OR SCHEDULE LASER BEAM CLEANING OF SOLAR PANEL

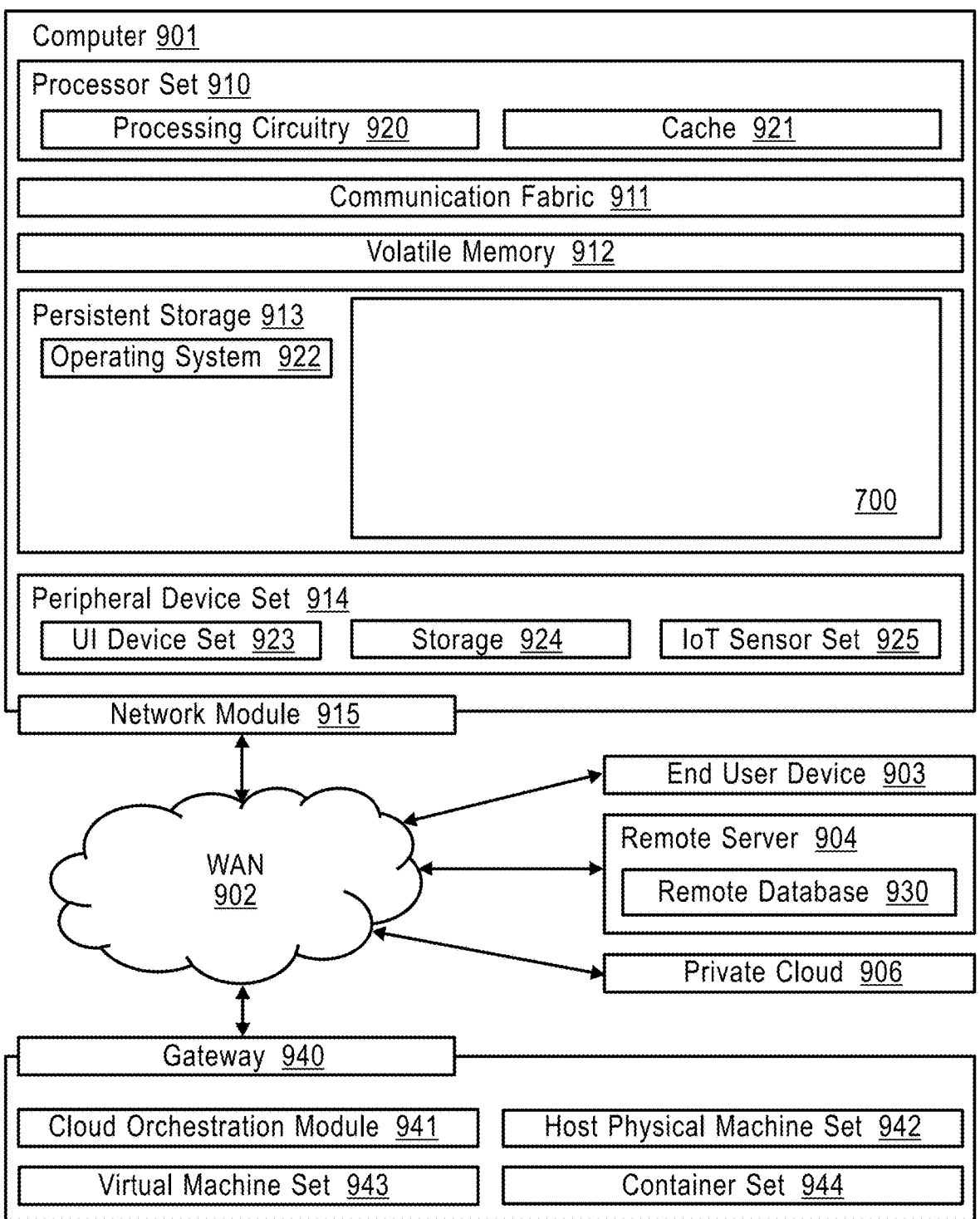

Computer 901

Processor Set 910

Processing Circuitry 920   Cache 921

Communication Fabric 911

Volatile Memory 912

Persistent Storage 913

Operating System 922

700

Peripheral Device Set 914

UI Device Set 923   Storage 924   IoT Sensor Set 925

Network Module 915

WAN 902

End User Device 903

Remote Server 904

Remote Database 930

Private Cloud 906

Gateway 940

Cloud Orchestration Module 941   Host Physical Machine Set 942

Virtual Machine Set 943   Container Set 944

FIG. 9

IOT ENABLED LASER-BASED POINTED CLEANING OF SOLAR PANEL

BACKGROUND

This disclosure is directed to solar panels, and computer applications, and more particularly to computer-implemented methods and systems for localized laser cleaning of solar panels by identifying dust hotspots.

Solar energy is radiant light and heat from the sun that can be harnessed to generate electricity. Solar panels can receive solar energy and convert received solar energy into electricity. A solar panel is a device including photovoltaic (PV) cells which are made of materials that generate electrons when exposed to solar energy/light. The electrons flow through a circuit and produce electrical energy, e.g., direct current (DC) electricity, that can be used to power various devices, homes, businesses, or can be integrated into electrical grid systems, e.g., microgrids, that can convert the power to alternating current (AC) to provide power to various consumer loads or be stored in batteries.

Solar power is expected to reach 10 percent of global power generation by the year 2030.

SUMMARY

A computer implemented system and method for identifying, characterizing, and localizing the accumulation and distribution of dust hotspots on solar panels so as to effect efficient cleaning thereof through pin-pointed laser cleaning.

In an embodiment, a laser cleaning system includes a hydraulic- or pneumatic-capability enabled telescopic laser cleaning module used for localized laser beam cleaning by identifying dust hotspots and accounting for the tradeoff between the energy lost in the cleaning (the power consumed by the laser) and power gained from the cleaned solar panel.

The system and method provide capability to pin-point and identify using a camera, and/or IoT feed, the dust contours responsible for reduction in solar panel power output by analyzing weather conditions, power output and time series images, and remove the dust hotspots through pointed laser cleaning by adjusting the focal length of the laser beam.

In an embodiment, based on received camera and/or IoT feed images of the solar panels, the system and methods create a heatmap for use in determining the distribution and accumulation of dust on the solar panels.

Thus, in one aspect, there is provided, a method for cleaning a surface of solar panel. The method comprises: receiving, at a hardware processor, one or more of: a current power output measure of the solar panel responsive to a solar panel surface exposure to solar energy and a presence of an accumulated substance formed on the solar panel surface, a current weather condition of an environment within which the solar panel is located, and a current image of a surface of the solar panel obtained from an imaging device, the current image of the solar panel surface revealing the presence of an accumulated substance; running, using the hardware processor, a machine-learned (ML) prediction model, the ML prediction model trained to predict a decrease in power output of the solar panel based on one or more of the received current power output measure, the current weather condition and a solar panel surface image that reveals the presence of the accumulated substance on the solar panel surface; determining, using the hardware processor, whether a predicted decrease in power output of the solar panel is greater than a pre-determined threshold power decrease; responsive to a determining that the predicted decrease in power output of the solar panel is greater than the pre-determined threshold power decrease, locating a laser beam generator device proximate the solar panel surface, the laser beam generator device having a laser source for focusing generated laser beams at the solar panel surface; and generating, by the laser source, laser beams for impingement upon the accumulated substance on the solar panel surface to precisely remove the accumulated substance on the solar panel surface.

In a further aspect, there is provided, a computer-implemented system for cleaning a surface of a solar panel. The system comprises: one or more computer processors; one or more non-transitory computer-readable storage media; program instructions, stored on the one or more non-transitory computer-readable storage media, which when implemented by the one or more processors, cause the computer system to: receive one or more of: a current power output measure of the solar panel responsive to a solar panel surface exposure to solar energy and a presence of an accumulated substance formed on the solar panel surface, a current weather condition of an environment within which the solar panel is located, and a current image of a surface of the solar panel obtained from an imaging device, the current image of a solar panel surface revealing the presence of an accumulated substance; run a machine-learned (ML) prediction model, the ML prediction model trained to predict a decrease in power output of the solar panel based on one or more of the received current power output measure, the current weather condition and the solar panel surface image that reveals the presence of an accumulated substance on the solar panel surface; determine whether a predicted decrease in power output of the solar panel is greater than a pre-determined threshold power decrease; and responsive to a determining that a predicted decrease in power output of the solar panel is greater than a pre-determined threshold power decrease, locate a laser beam generator device proximate the solar panel surface, the laser beam generator device having a laser source for focusing generated laser beams at the solar panel surface; and generate, by the laser source, laser beams for impingement upon an accumulated substance on the solar panel surface to precisely remove the accumulated substance on the solar panel surface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 7 depicts a flow diagram showing a method of the present disclosure in one embodiment;

FIG. 9 depicts a computing environment containing an example of an environment for the execution of at least some of the computer code involved in performing the inventive methods according to the embodiments herein.

DETAILED DESCRIPTION

Figure 1A:
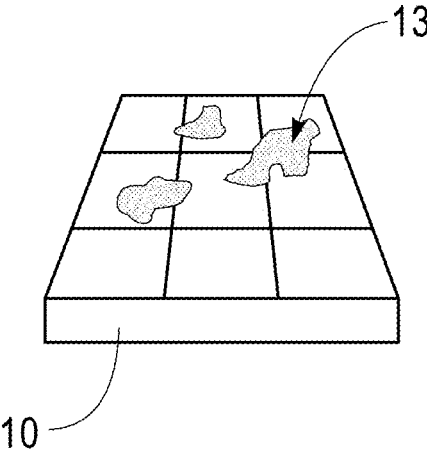
FIGS. 1A-1D show various examples of types of dirt accumulated on a solar panel.
Figure 1B:
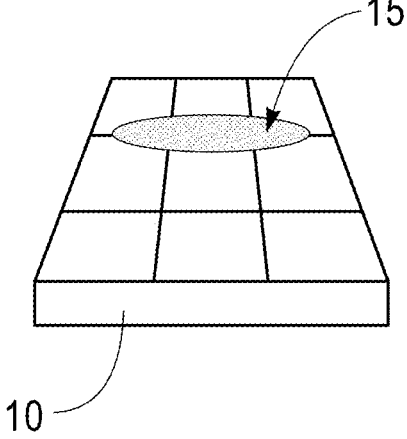
Figure 1C:
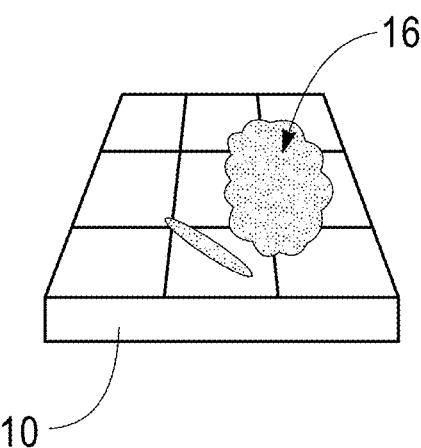
Figure 1D:
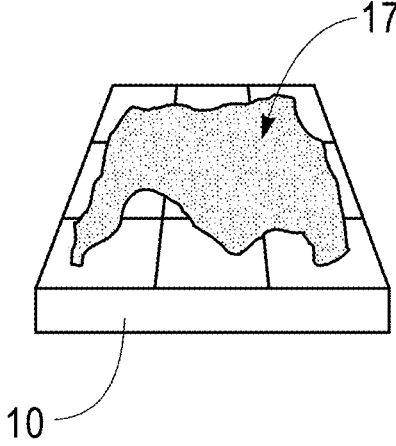

The present disclosure relates to a laser-based solar power cleaning system and method that enables scheduling and cleaning of photovoltaic (PV) cells or solar panels.

Because of accumulation of dust, dirt and grime over a period of a time, bird droppings on a solar panel etc., the power generation capability of solar panels is reduced. So, there is a need periodically clean solar cells. Especially in a dusty area, like in any open field, a desert, a mining area etc., the accumulation of dust on the solar panel will be maximized.

FIGS. 1A-1D show various examples of types of dirt accumulated on a PV cell or solar panel 10, including isolated brown dust spots 13 or dust patches 15, white dust regions 16 and gray dust blobs 17 (all hereinafter referred to as "hotspots"). Each of these different types of dust spots or patches or regions that can accumulate on solar panel surfaces can be mineral dusts, metallic dusts, chemical dusts or organic dusts and their presence and accumulation prevent the solar power from efficiently converting solar energy received into electricity and hence reduce solar panel power output. That is, each of these solar panels 10 generate decreased solar panel output when dirtied in the manner as shown in FIGS. 1A-1D.

Figure 2:
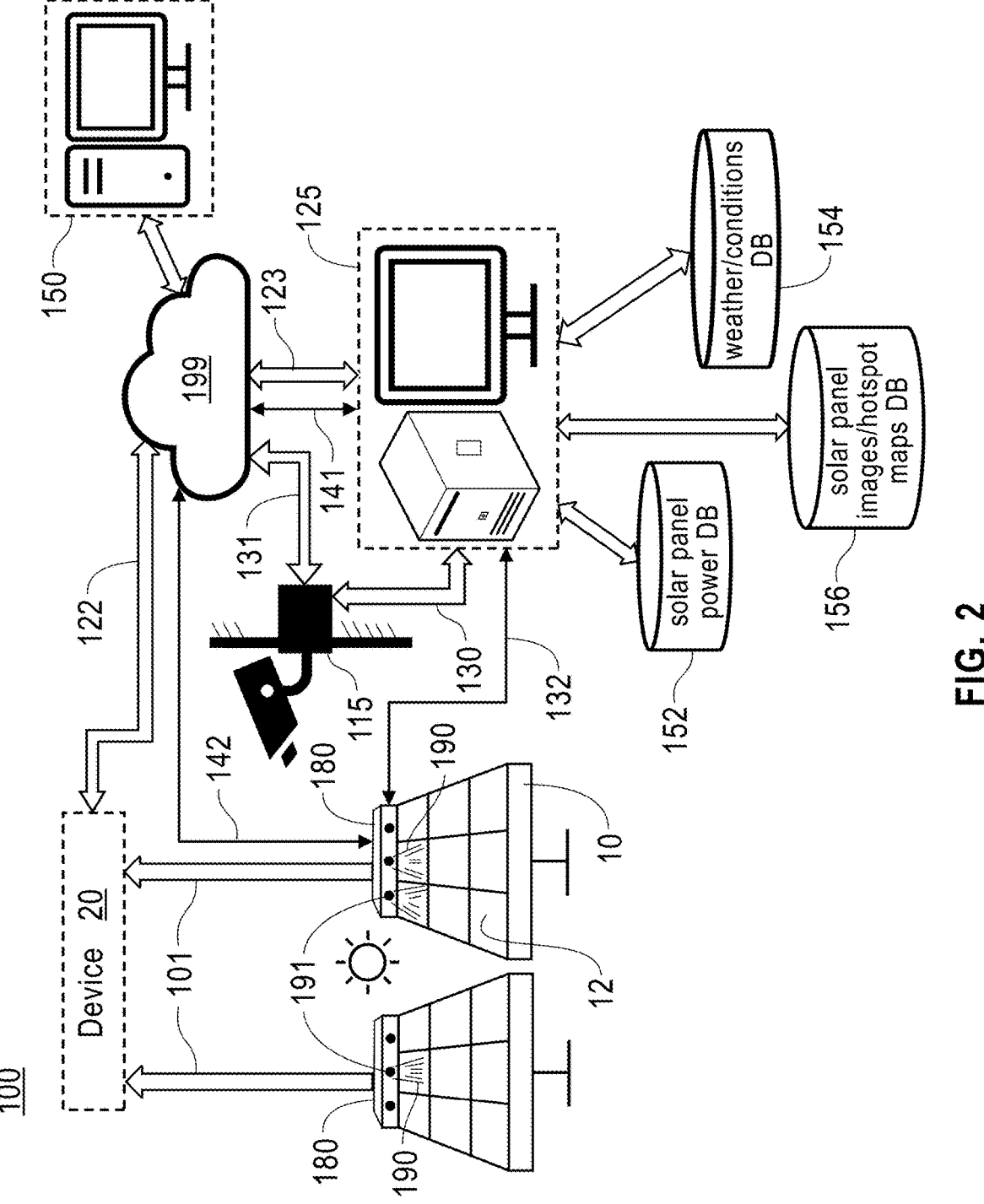
FIG. 2 illustrates a laser-based solar panel cleaning system for cleaning solar panels in accordance with aspects of the disclosure.

FIG. 2 illustrates a laser-based solar panel cleaning system 100 for cleaning photovoltaic (PV) cells or solar panels 10 dirtied in the manner such as shown in FIGS. 1A-1D. In embodiments, the laser-based solar power cleaning system 100 and method enables scheduling and cleaning of solar panels 10. The system 100 includes a wired or wireless communications network 199 enabling communication among one or more computing devices, e.g., computer devices 125, 150 that can take many forms, for example, a computer, laptops, smart phones, personal assistants, terminals, a virtual computer, or virtual machine (VM), a server, or a computing node.

For non-limiting purposes of illustration, in FIG. 2, solar panel 10 generates solar power 101 that is used to power an electric device 20. Electrical device 20 can be any device that consumes electrical energy however can also include an energy storage system (e.g., a rechargeable battery) or can be part of a microgrid power distribution system that distributes electrical energy produced by the solar panels 10. In an aspect of the present disclosure, the device 20 can be a power metering device and precise amounts of power 101 generated by the solar panels 10 at different times and varying weather or sunlight conditions can be recorded and stored as solar panel power generation information. For example, computing device 125 can receive power generation information from the solar panel 10 (or alternatively, power consumption information from device 20) over conductors 122, 123 over communications network 199 and can store information such as the amounts of power 110 generated by the solar panels 10 at different times in an associated solar panel power database 152. Further, computing device 125 can receive a real-time weather feed or like sensor feed providing the current weather conditions at the solar panel, e.g., the current weather precipitation and/or sunlight condition(s) at the time the solar panel output power is obtained, and can store weather information at different times in an associated solar panel weather conditions database 154.

As shown in FIG. 2, the laser-based solar panel cleaning system 100 includes an Internet-of-Things (IoT) sensor such as an imaging device, e.g., a camera 115. Camera 115 is in operable communication with computing system 125, e.g., for periodically receiving control signals from computing system 125 to operate the camera device 115 and/or for sending images of the solar panel surface back to computing system 125. For example, such control signals or images can be communicated between computing system 125 either directly over IoT feed conductors 130 or over via IoT feed network connections 131. Such imaging device or camera 115 can be mounted at or situated proximate to the solar panel 10 and configured with circuitry responsive to control signals to obtain images of the surface 12 of each solar panel 10 for use in identifying locations of any dirt or grime level accumulated at the solar panel surface 12. Computing device 125 can receive the images taken of the solar panel surface at the time the solar panel output power is obtained, and can store these images in a solar panel images database 156. Subsequently, based on the images obtained by camera 115, computing system 125 can process the images to determine a level of dust, dirt and/or grime accumulated on a surface 12 of the panel. Moreover, based on the solar panel images data obtained from the camera 115 via an IoT feed, the computing system 125 can run methods to generate "heatmaps" for use in detecting or identifying the dust "hotspots" corresponding to the distribution of dust, dirt or grime accumulated on a solar panel surface. The computing system can generate a heatmap of the accumulation of dust on the solar panels and store these as images in the solar panel images database 156. In embodiments, the computing system camera device 115 can be controlled to automatically obtain images at a predetermined frequency, e.g., every 10 seconds.

As further shown in FIG. 2, laser-based solar panel cleaning system 100 includes a telescopic laser system or laser cleaning module 180 configurable for generating laser beams 190 that can be pin-point directed for incidence upon the solar panel surface 12 to clean the accumulated dust or dirt. As referred to herein, "telescopic laser system" refers to a laser attached with an adjustable lens that assists in shaping and controlling the laser beam so that there will be a precise pointed focus on the targeted hotspots (dust). That is, once hot spots are detected, laser cleaning module 180 can perform a pointed/controlled laser operation to remove the dusts. In an embodiment, the laser cleaning module 180 is equipped with a hydraulic or pneumatic capability for locating laser system above the panel surface (e.g., Z-axis movement) and along the length of the panel (e.g., the X-Y plane movement). In an embodiment, laser cleaning module 180 is in operable communication with computing system 125, e.g., for receiving control signals from computing system 125 for locating the laser beam source, e.g., gas-based, solid-state or semiconductor or diode-based laser 191 of laser cleaning module 180, at specific location within the space (e.g., X-, Y- and Z-axis locations) above the panel surface 12. Based on a location coordinate(s) identifying upon the solar panel surface 12 the dust hotspot, the laser beam control circuitry responsively generates precisely powered laser beams 190 that are aimed at the solar panel surface to clean the solar panel surface 12 at the specific identified location. In embodiments, the control signals include the locations to which the laser beam 190 is to be directed, e.g., X-, Y- and Z-axis coordinates relative to the solar panel surface 12 corresponding to a location of an identified hotspot obtained from the heat map of the dust accumulations generated based on camera or IoT feed images. In an embodiment, control signals for controlling laser cleaning module 180 can be received from computing system 125 either directly over conductors 132 or over via communications network connections 141, 142.

Figure 3:
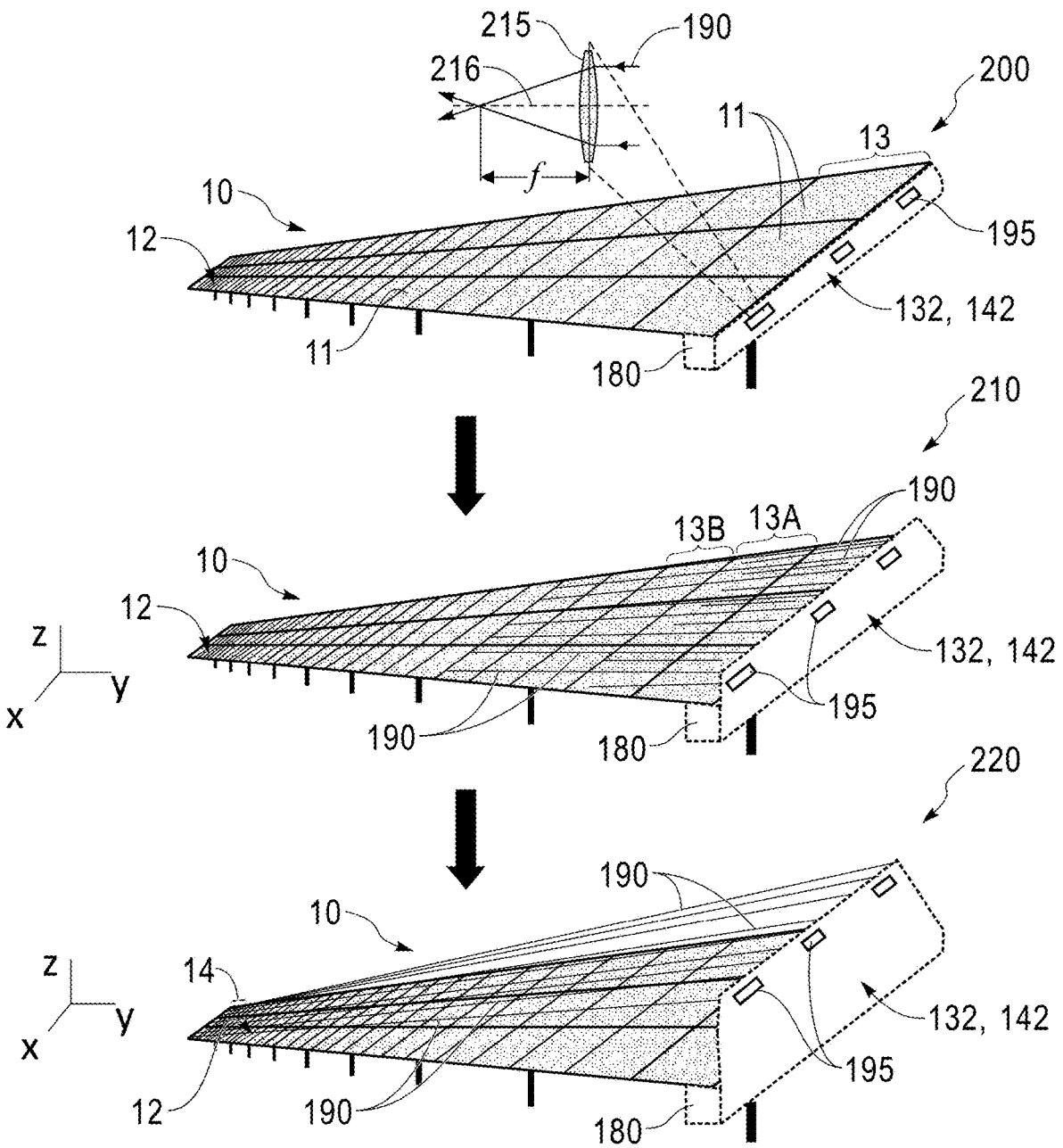
FIG. 3 depicts a series of cleaning operations of the laser system using a hydraulic or pneumatic 3-D axis movement and telescopic lens adjustment in accordance with aspects of the disclosure.

In an embodiment, once hot spots are detected, laser-based solar panel cleaning system 100 performs a pointed/controlled laser operation to remove the dust, dirt or grime from the solar panel surface. FIG. 3 depicts a series of cleaning operations of the laser cleaning module 180 using a hydraulic or pneumatic 3-D axis movement and telescopic lens adjustment. Initially, at 200, FIG. 3, the hydraulically- or pneumatically-controlled telescopic laser cleaning module 180 is attached to the solar panel 10, for example, when the solar panel 10 is not in use. For example, the hydraulic- or pneumatic-capability enabled telescopic laser cleaning module 180 can be integrated as part of solar panel 10 or can be attached at one end of any row of solar panel 10. In an embodiment depicted, the telescopic laser cleaning module 180 is located at an end of an initial "column" 13 of the solar panel 10. In an alternate embodiment, the hydraulic- or pneumatic-operated capability enabled telescopic laser cleaning module 180 can also be portable and in autonomous manner can move among the solar panel rows 11 along X-Y directions. Such telescopic laser cleaning module 180 is situated above the solar panel surface 12 and configured with a laser bean source and associated laser beam generation circuitry 195 responsive to control signals received over conductors 132 or 142 to control the direction of the generated laser beams 190 at specific coordinates on the solar panel surface 12. In an embodiment, there are three laser beam sources 195 corresponding to each "row" 11 of the solar panel 10 (with three rows 11 depicted in the non-limiting example of the solar panel 10 of FIG. 3). In an embodiment, the hydraulic- or pneumatic-operated capability enabled telescopic laser cleaning module 180 will have an adaptable or changeable telescopic lens attachment(s) 215 corresponding to each respective laser beam source/circuit 195 that is responsive to control signals such that the laser beam cleaning module 180 laser emitting source can emit a laser beam 190 directed for impingement at an appropriate distance and position on the solar panel surface of a solar panel column.

For example, as shown at 210, responsive to control signal received at circuits 195 from conductors 132 or 142, the telescopic system of the laser cleaning module 180 is controlled for movement within three-dimensional e.g., X, Y, Z coordinate space to a position above the panel surface to clean the solar panel 10. For example, at 210, the hydraulically- or pneumatically-controlled telescopic laser cleaning module 180 is located at an end of an initial "column" of the panel however at an increased height along the Z-axis direction relative to the solar panel surface 12 and is shown emitting controlled laser beams 190 optimized to clean the solar panel 10, e.g., at the solar panel surface 12 at column 13A. In operation, the laser cleaning module 180 can be further controlled to move along the Y-axis direction from one column of the solar panel, e.g., column 13A to another column along the solar panel surface 12, e.g., column 13B. In an embodiment, the laser cleaning module 180 includes telescopic lens device 215 that can receive the laser beam and focus the laser beam at a specific location corresponding to a focal length distance "f" 216 from the location of the lens. In an embodiment, the lens 215 is a convex shaped lens and can be auto-adapted to direct the laser cleaning module 180 to a target cleaning location. That is, the focusing of laser beams 190 can correspond to a precise location by controlling a focal length 216 of the lens 215. The lens 215 attached to the laser controls the shape and the focus of laser beam to the targeted hotspots. For example, the convex lens 215 can be used to concentrate the pointed laser beam 190 with higher laser intensity on smaller surface area with high accumulation of dirt spots. A concave lens can be used spread the laser beam 190 to a larger area with lower laser intensity (e.g., useful in case of mild concentration of dust on larger surface).

Continuing in FIG. 3, as shown at 220, responsive to the received control signals received at control circuits 195 over conductors 132 or 142, the telescopic system of the laser cleaning module 180 is further controlled for movement within a three-dimensional, e.g., X, Y, Z coordinate space above the panel surface to a position optimized to apply laser beams 190 at locations situated at a longer distance away from the laser beam source at laser cleaning module 180. Thus, the hydraulically- or pneumatically-controlled telescopic laser cleaning module 180 is shown at an increased height location along the Z-axis direction relative to the solar panel surface 12 and is shown emitting controlled laser beams 190 that are incident for optimized cleaning at a further location at a longer distance from the laser cleaning module 180 to clean the solar panel 10. In an embodiment, the lens adjustment to the laser beam 190 is performed to achieve the longer beam distances, e.g., laser beams 190 impinging at a last solar panel column 14 to clean debris at that solar panel column. The adjustment of lens refers to change in focal length which in turn controls the shape and laser beam intensity.

Figure 4:
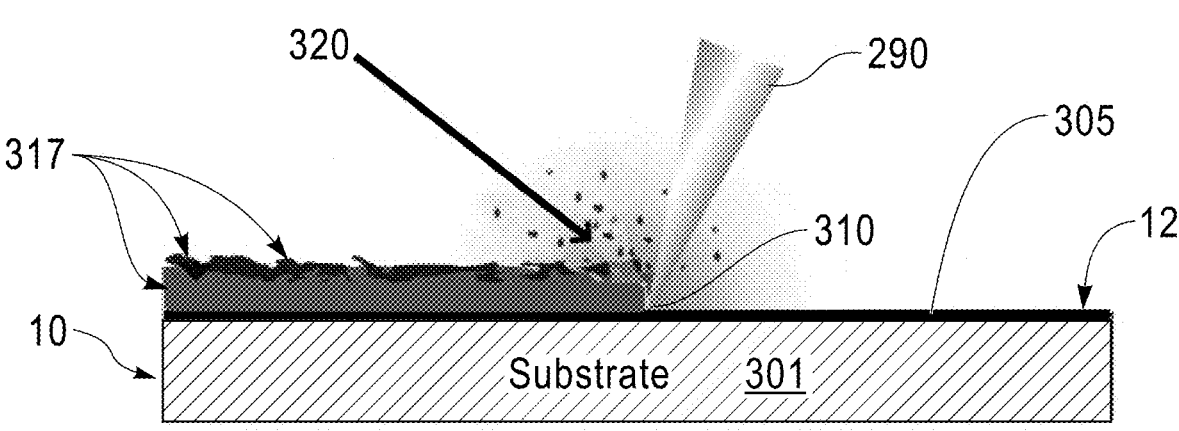
FIG. 4 depicts a close-up view of a portion of the solar panel consisting of at least a top oxide layer above a substrate layer and shown having an identified accumulation of dust/dirt hotspot to be removed in accordance with aspects of the disclosure.

FIG. 4 depicts a close-up view of a portion 300 of the solar panel 10 consisting of at least a top oxide layer 305 above a substrate layer 301 and shown having an identified accumulation of dust/dirt (hotspot) comprising a dirt layer 317. In FIG. 4, the generated pin-pointed laser beam 290 is shown impinging upon the solar panel surface 12 at the surface. This angle is referred to as an impact angle, the angle the emitted laser beam makes with a solar panel surface. The interaction of the dirt and the laser beam 290 creates a material plasma 320 that removes the dirt layer at the impinging location 310.

As will be described in further detail, based on a combination of received weather data, power output data, and solar image data, a machine-learned (ML) model is generated that can be used to optimally schedule the laser cleaning system 100 system to apply pin-pointed laser beams 190 to dust contours and remove the dust hotspots through pointed laser cleaning of the solar panel surface 12. In embodiments, the laser-based cleaning module will identify an optimum cleaning time when the laser-based cleaning is to be performed based on power conservation considerations. Otherwise, a selective cleaning can be performed on the solar panel.

Figure 5:
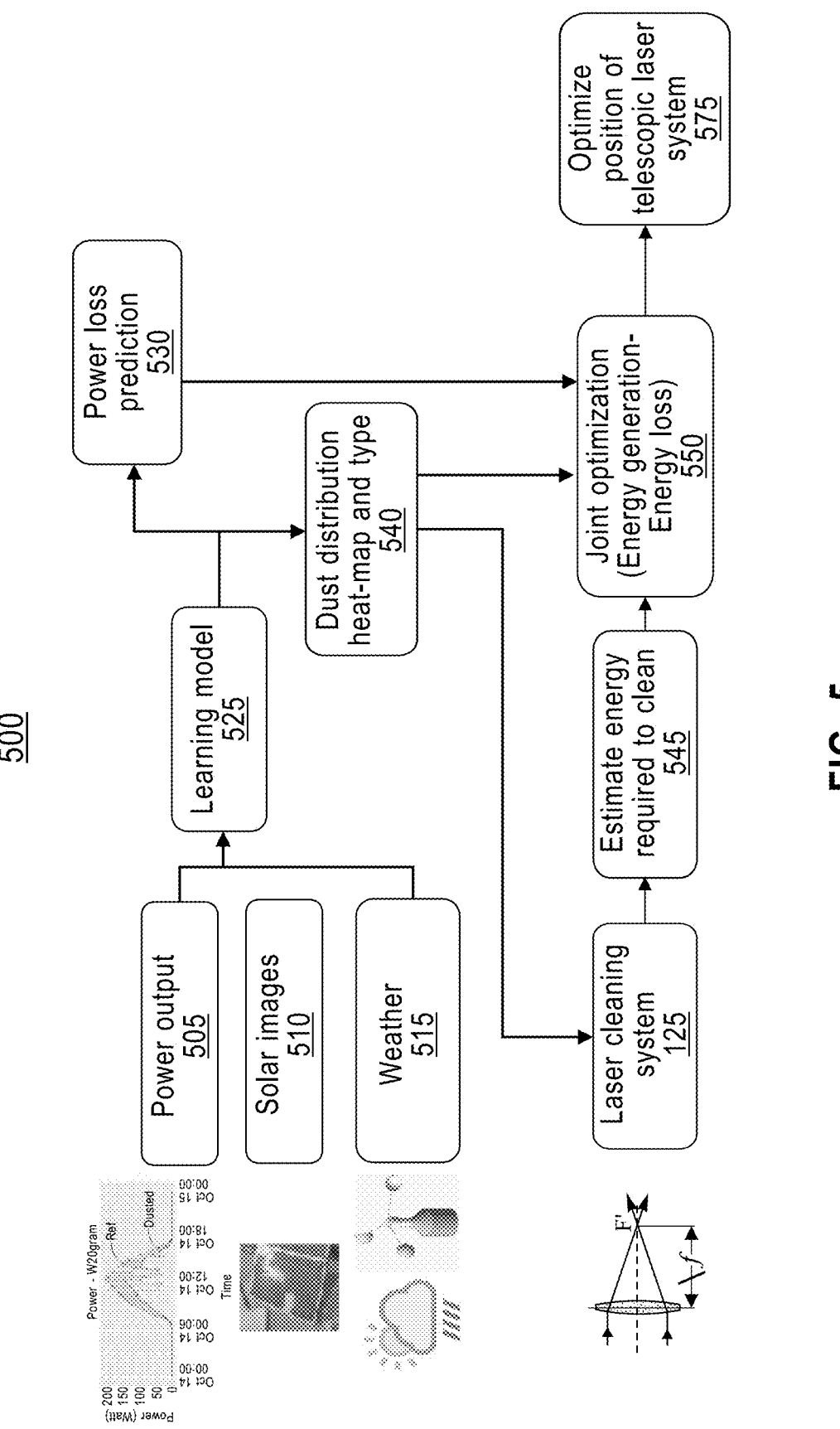
FIG. 5 depicts a block diagram of the system architecture used for conducting optimal telescopic laser cleaning using the laser cleaning system depicted in FIG. 2 in accordance with aspects of the disclosure.

FIG. 5 depicts a block diagram of the system architecture 500 used for conducting optimal telescopic laser cleaning using the system depicted in FIG. 2. As an example, the system architecture, includes receiving at a computing device, e.g., device 125, information over time that can be used to build a predictive machine-learned model to predict an optimal time to conduct a solar panel cleaning. In particular, over time, as shown in FIG. 5, the following data and information can be obtained from the system depicted in FIG. 2: power output data 505 which is the energy output produced by a solar panel (e.g., in Watts) at a periodic time interval, e.g., monitored on the order of minutes, however the periodic time can be user configurable; solar panel images 510 obtained from camera device 115 at a periodic time interval, e.g., every day or week, which images are used to identify dust hotspots; and weather conditions data 515 such as, for example, full sunlight, partial sunlight, precipitation, wind, etc. that the solar panel is subject too at periodic time intervals, e.g., every day or week. For example, weather conditions at a solar panel can be obtained at the time solar panel power output data information is collected from that solar panel. The collected solar panel power output data 505, the corresponding solar panel images 510, and the weather data 515 are subject to a supervised learning technique to generate a ML predictive or forecast model 525 that can predict a degradation or reduction in solar panel power output as a function of accumulated dust hotspots and/or certain variable weather conditions that the solar panel is subject to.

As shown in FIG. 5, over time, based on the collected historical solar power output data 505, corresponding solar panel images 510 and subject weather conditions data 515, a convolution neural network (CNN) model, recurrent neural network (RNN) model or like deep neural network machine-learned (ML) model 525 can be trained to predict a loss of solar panel output based on a correlation of prior instances of reduced solar panel power generation output with learned features from the solar panel images such as recognized patterns or instances of accumulated dust "hotspots" at that solar panel surface in addition to a weather condition the panel was subject to. One non-limiting method can include use of a fully convolutional network that predicts power with Mask localizing the region causing power loss.

Then, at 525, FIG. 5, the use of the ML model is to effect optimal laser solar panel surface cleaning that accounts for a tradeoff between the power consumed by the laser cleaning system, an energy loss value $$\delta_i^r,$$

to clean a solar panel surface at hotspot location(s), and the solar panel output power gained from the cleaned solar panel. In an embodiment, given current solar panel power output data 505, corresponding solar panel images 510 and subject weather conditions data 515, the model at 530 is used to generate a prediction of solar panel power loss at a future time instant, e.g., next day, next week. For example, the learned model 525 can detect increasingly lower amounts of solar panel power output, e.g., even on very sunny days, which could indicate accumulation of dust/dirt spots that should be cleaned. Further, the dust heatmap distribution 540 and a type of dust/dirt accumulated can be obtained from the solar panel images and input to the laser cleaning system computing device 125.

Figure 6:
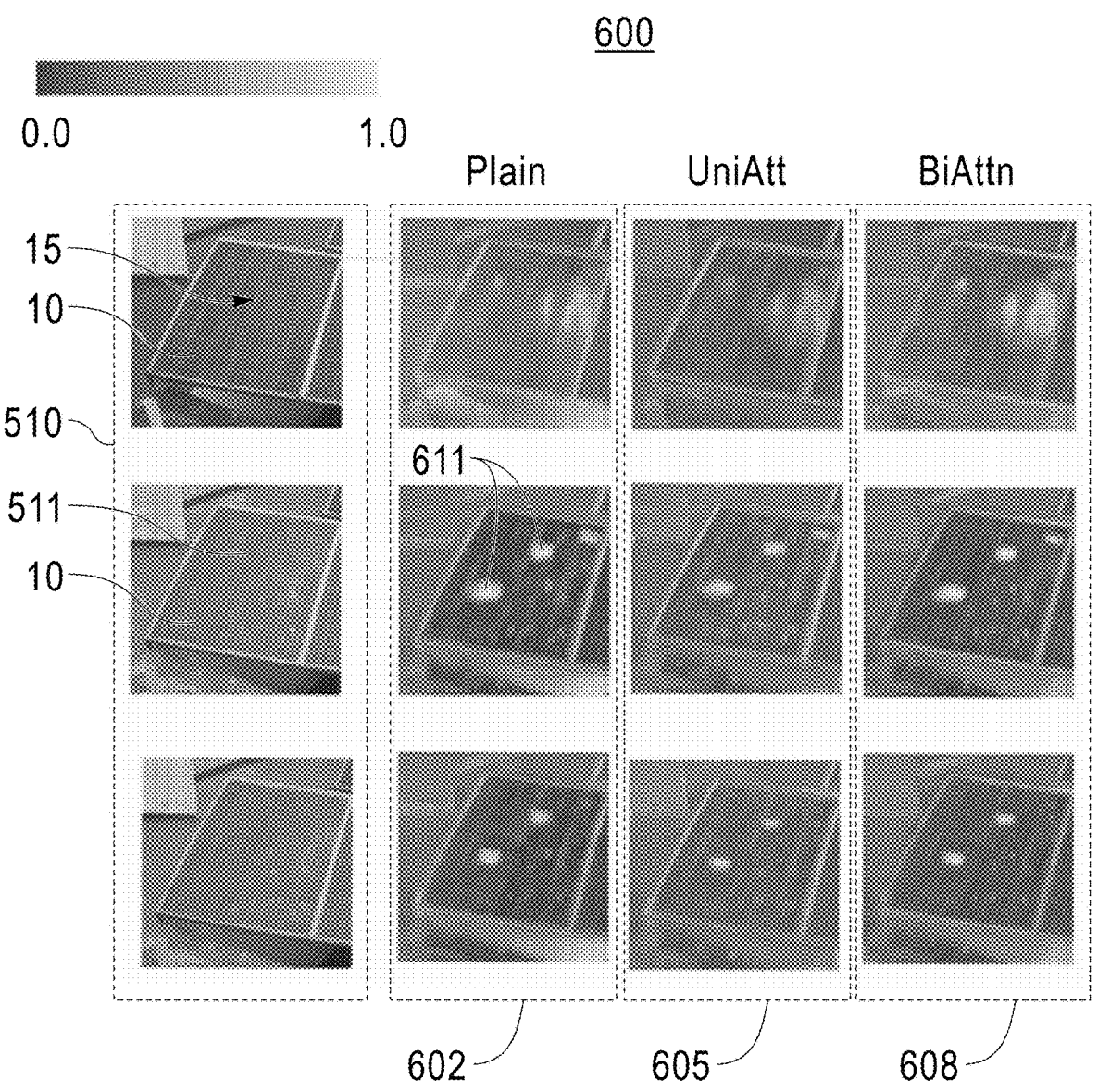
FIG. 6 shows an example set of solar panel images that are input to the solar panel power loss prediction model for features processing to pinpoint the location of dust contours or dust distributions potentially responsible for reduction in power output.

FIG. 6 in particular shows an example set 600 of solar panel images 510 that are input to the solar panel power loss prediction model for features processing to pinpoint the location of dust contours or dust distributions potentially responsible for reduction in power output. In an embodiment, these solar panel images 510 can be used as actual input training images that each show a panel 10 including instances of accumulated dust hotspots 15 on the surface. In embodiments, the deep neural network learning model can incorporate Attention vector(s) of pixel importance weights to emphasize these potential dust hotspot features in the image. For example, for each solar panel image 510 shown in FIG. 6, there is shown corresponding multiple heatmap images, e.g., with each image size approximately 192×192 pixels. For example, FIG. 6 shows the corresponding processed solar panel image processing "heatmaps" images 602 obtained as a result of plain CNN network processing; corresponding solar panel image processing heatmap image results 605 obtained as a result of using a Unidirectional Attention architecture; and corresponding solar panel image processing heatmap image results 608 obtained as a result of using a Bidirectional Attention architecture. In an example implementation, deep neural network processing of solar panel images 510 using each of these methods can achieve high level accuracy in detecting the distributions of dust hotspots 15. For example, heatmap processing of a solar panel image 511 reveal a presence and location of dust hotspots 611. In an embodiment, given an image pixel location, and given the dimensions of the solar panel, a simple mapping algorithm can be performed to map the locations of identified dust hotspots 611 in the heatmap images in terms of specific X-Y coordinates on the solar panel 10 to which to adjust a telescopic lens focal point for locating a cleaning laser beam 190.

Returning back to FIG. 5, at 545, computing device runs a program for estimating an amount of energy $$\delta_i^r$$

that would be expended by the laser cleaning system 200 to clean the obtained dust hotspots from the solar panel surface 12 at locations identified in the input dust/dirt heatmaps. Then at 550, a joint optimization function is computed to optimize the time for cleaning the solar panel surface in the manner as shown in FIG. 3 based on a tradeoff between the energy consumption of the laser to clean the panel and the energy or power gained as output from the "cleaned" solar panel. Based on the joint optimization function results, i.e., energy or power gained≥energy or power consumed by laser cleaning system, at 575, the laser cleaning system hydraulically- or pneumatically-adjusts the position of the telescopic laser beam generator of the laser cleaning system to an optimized position for laser beam cleaning.

In embodiments, once a solar panel power loss prediction model 525 is generated, the model is continually updated and revised as new training instances, e.g., new solar panel power output data 505, corresponding solar panel images 510 and subject weather conditions data 515, are received and processed for laser cleaning predictions.

FIG. 7 depicts a flow diagram showing a method 700 of the present disclosure in one embodiment. At 702, there is first performed a training of a solar power output prediction model 525. The solar power output prediction model receives input historical data, e.g., from a prior year or six month period, the historical data used for training the model including but is not limited to: 1) solar panel power output values measured at various time instances i to obtain how the solar panel power output changes; 2) a detection of the weather conditions or weather parameters (e.g., 100% cloudy, 50% cloudy, etc.) at time instance(s) i when the solar panel's energy output is obtained; and 3) an IoT or camera feed image of the solar panel surface obtained at the time instances i when the solar panel's output measurement is obtained to determine any dust hotspots, for example. Based on these input data, a deep learning (e.g., CNN, RNN) solar power output prediction model is trained to estimate how the solar panel power output changes as a function of dust hot spot accumulation and/or weather conditions. The trained ML prediction model 525 is then used to predict, in the near future, a solar panel output power loss value which can be used to determine an optimal time to clean the solar panel surface using the laser cleaning system. FIG. 7 at 704 depicts a step of receiving at the computer system 125 a new solar power output reading, a current weather condition or weather condition forecast and/or a panel surface image from camera feed. Based on these current values, at 706, FIG. 7, the solar power output prediction model is run to determine a future power loss value in a prediction time horizon, e.g., subsequent prediction time horizon (e.g., days i=1 . . . . N).

Figure 8:
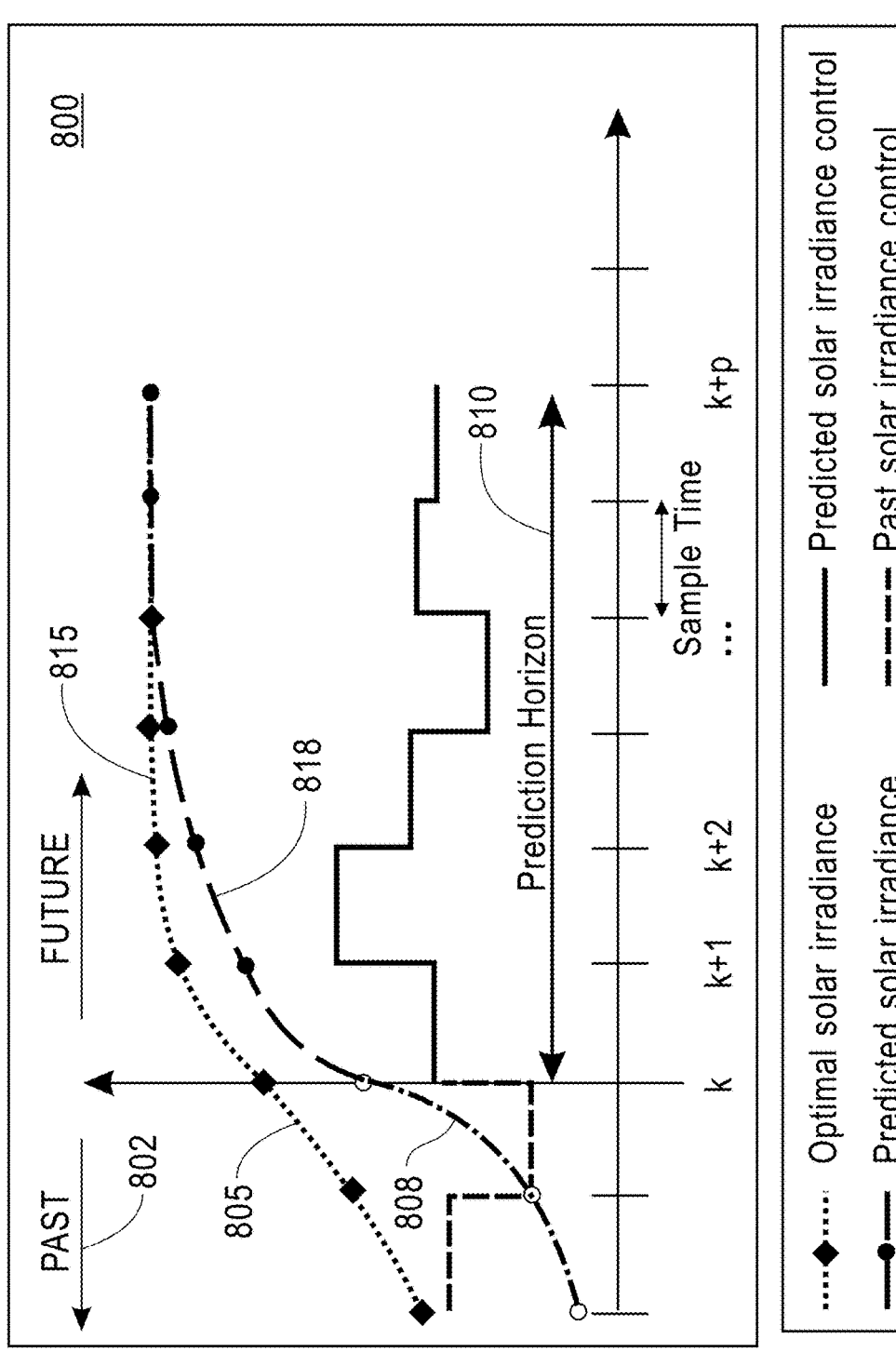
FIG. 8 is a visual depiction of how the trained solar power output prediction model is used to predict an optimal time to clean the solar panel surface using the laser cleaning system over a prediction time horizon (>time k)

FIG. 8 is a visual depiction of how the trained solar power output prediction model is used to predict an optimal time to clean the solar panel surface using the laser cleaning system over a prediction time horizon (>time k). In FIG. 8, a plot 800 depicts how to determine the energy loss values that are used in the joint optimization function evaluation. In FIG. 8, there is plotted the optimal solar irradiance of the sun 815 and predicted solar irradiance values 818 of the solar panel (Y-axis) over time (X-axis) over the next days k, k+1, k+2, . . . , k+p. For example, based on the past historical data used to train/update the model, the system determines at a prior time period 802 (<time k), the optimal solar irradiance represented as data values $$L_i^r$$

available at a prior time instants i as shown as plot 805. These data values from plot 805 represent the available solar irradiance power $$L_i^r$$

at that time instant i and correspond to an optimal amount of solar energy incident at a time instance i. Similarly, in prior time period 802, the system has measured the solar irradiance of the solar panel, i.e., the amount of solar-based power produced by the solar panel, $$L_i^m,$$

at a time instant i as shown as plot 808. The measured (captured) solar irradiance values $$L_i^m$$

of the solar panel is correlated to or a function of a weather condition(s) (e.g., sunny, % cloudy, etc.) detected at the same time instance i and is further a function of any accumulation of dust/grime hotspots at the solar panel surface that decreases the panel's ability to capture solar energy at time instance i. Given the current inputs of a measured solar output power, a received current or forecast weather condition, and/or solar panel image, the trained model is run to estimate a power loss for that solar panel. The power loss represents a difference between the optimal solar irradiance power value available, $$L_i^r,$$

as shown as plotted optimal solar irradiance of the sun 815 determined for the future prediction horizon at future time instances k, k+1, k+2 . . . k+p, and a predicted solar irradiance value predicted to be consumed by the solar panel, $$L_i^m,$$

using the model, as shown as plotted solar irradiance values 818 determined for the future prediction horizon at future time instances k, k+1, k+2 . . . k+p.

Returning to step 710, FIG. 7, using the ML-model, using the values obtained from FIG. 8, the system makes a determination if the predicted solar panel power loss is greater than a predetermined threshold value, e.g., greater than 10% or a value greater than 10%. If it is determined at 710 that the difference between the optimal solar irradiance power value available $$L_i^r$$

determined for the future prediction horizon and a predicted solar irradiance value predicted to be consumed by the solar panel $$L_i^m$$

using the model is not greater that a loss threshold, e.g., is less than 10%, then the process will return back to 704 in order to continue the monitoring process by repeating steps 704 to receive one or more of: a new solar panel output power, additional solar panel surface image(s), and/or current weather condition data, and at 706, run the prediction model again to predict a future solar panel power loss. Otherwise, at 710, if it is determined that the difference between the optimal solar irradiance power value available $$L_i^r$$

determined for the future prediction horizon and a predicted solar irradiance value predicted to be consumed by the solar panel $$L_i^m$$

using the model is greater that a loss threshold, e.g., is greater than 10%, then the process proceeds to 713 to determine, using an optimization cost function, an optimal time to clean the solar panel surface using the telescopic lens laser cleaning module 180.

That is, at 713, FIG. 7, to determine the tradeoff between the energy consumption of the laser system to clean the distribution of dust hotspots 15 from the panel surface and the energy or power gained as output from the cleaned solar panel, reference is had to a joint optimization cost function J computed at 550, FIG. 5 and set forth as follows:

$$J = \sum_{i=1}^{N} w_{\delta_i}(\delta_i^r) + \sum_{i=1}^{N} w_{L_i}(L_i^r - L_i^m)^2 + \\ \sum_{i=1}^{N} w_{u\delta_i}(\Delta u)^2 + \sum_{i=1}^{N} w_{vL_i}(\Delta v)^2$$

subject to $$0 \le \delta_i^r \le \delta^{max} \text{ and } 0 \le L_i^m \le L^{max},$$

where J is a cost function over the receding horizon, i is an index of next subsequent days, e.g., 1, . . . , N (e.g., where N=7), $$\delta_i^r$$

is the determined energy lost to clean the panel for the instant 'i', $$L_i^r$$

is the available solar irradiance at the panel for the instant 'i', $$L_i^m$$

is the captured solar irradiance at the panel for the instant 'i', u is the impact angle (the angle between a normal axis to the solar panel surface and the direction of the solar energy received from the sun at the solar panel surface), v is the irradiance controller variable, $w_{\delta_i}$, $w_{L_i}$ are weighting coefficients for the laser system and irradiance respectively, $w_{u\delta_i}$, $w_{uL_i}$ are penalizing coefficients for big changes in energy lost in cleaning and power drop respectively, 'm' refers to measured or actual values, 'r' refers to reference or optimal value and $\delta^{max}$, $L^{max}$ are the maximum limit for power consumed by the laser system and irradiance respectively. By computing this optimization function, it is determinable whether the cost function is greater than some threshold value, e.g., a threshold value of 0.

Thus, given the number of distributed dust hotspots 15 identified to be removed from the panel surface, the laser beam cleaning system will be able to estimate how much energy $$\delta_i^r$$

would be consumed to remove those hotspots with laser beams by the laser clean system. The power loss prediction model further provides the power loss estimate $$(\text{e.g., } L_i^r - L_i^m)$$

for that solar panel over a period of days i in the future which correlates to how much energy would be gained if the panel is fully cleaned. This quantity could also represent the additional potential energy gain that could be obtained by cleaning the solar panel through a pointed laser with $$L_i^r$$

referring to the available irradiance and $$L_i^m$$

referring to the captured irradiance. These values are input to the joint optimization function J and the optimization function will output a value that decides whether to clean the panel or not. Returning to FIG. 7, at 720, a determination is made as to whether the computed joint optimization function J is greater than some threshold value, e.g., a threshold value of 0. If the computed cost function J is less than 0, then this indicates that the increased energy output (power output) of the solar panel due to the laser cleaning is still less than the energy expended by the laser cleaning system 200 to clean the obtained dust hotspots 15 from the solar panel surfaces 12 at locations indicated in the heatmap images and thus the timing to clean the solar panel surfaces is not currently optimal, as the cleaning energy expenditure exceeds power gain from cleaning the panel. Thus, no laser cleaning of the solar panel is initiated. As a result, the process returns to step 704, where the steps 704-720 are repeated. Otherwise, returning to 720, FIG. 7, if the computed cost function/is greater than 0, then this indicates that the increased energy output (power output) of the solar panel due to the laser cleaning is greater than or equal to the total energy expended by the laser cleaning system 200 to clean the obtained dust hotspots from the solar panel surface 12 at locations currently indicated in the heatmaps. As a result of this determination, at 725, FIG. 7, the laser cleaning system 200 will either: 1) immediately locate the laser cleaning system and initiate a laser beam cleaning and the telescopic lens of the laser system to remove the dust hotspots; or 2) indicate an advantageous or optimal time to clean the solar panel to rid the surface of the dust hotspots.

That is, at 725, FIG. 7, once it is determined that the computed cost function/indicates that the increased energy output (power output) of the solar panel due to the laser cleaning is greater than the energy expended by the laser cleaning system 200 to clean the obtained dust hotspots 15 from the solar panel, then the laser cleaning system can optimize the position of the telescopic laser system and the adjust the focal point of the lens for the laser beam focus in the manner as shown in FIG. 3 in order to locate the laser beam to efficiently clean the dust hotspots based on locations found in the heatmaps. That is, the position of the telescopic laser system is optimized to pin-point dust contours and remove the dust hotspots through pointed laser cleaning by adjusting the focal length of the laser beam using the telescopic lens at the laser beam source.

The method 700 depicted in FIG. 7 thus illustrates how the model can be used to determine an optimal time to clean the solar panel surface using the laser cleaning system. The method ensures very precise control of the laser cleaning system and is subject to small step changes while taking the whole prediction horizon into account. For instance, at each step, the angle of the laser beam impinging on the solar panel surface should be chosen such that it is optimal for next 'k' steps. In an embodiment, there is applied a penalizing factor when there is any frequency changes or bigger changes in the focal length of laser beam considering the future predicted irradiance and its power loss. Thus, it is desired to take a decision at time 't' such that it will be optimal not only for current time 't' but also considering the future 'k' steps. Thus, in an exemplary scenario, if it was determined to expect an increase in the focal length by 10% at time 't' and immediately decrease by 20% in next time step 't+1', this sudden change will lead to an increase in energy loss for laser cleaning. The system addresses this by gradually increasing/decreasing the focal length considering the future time steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As shown in FIG. 9, computing environment 900 contains an example of an environment for the execution of at least some of the computer code involved in performing the inventive methods, such as the code 700 for generating and running the solar panel power loss prediction model 525, generating heatmap images of the solar panels, and performing the joint optimization computation, e.g., in accordance with the method depicted in FIG. 7. In addition to block 700, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 200, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

Computer 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

Processor Set 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip."

In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 200 in persistent storage 913.

Communication Fabric 911 is the signal conduction path that allows the various components of computer 901 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

Persistent Storage 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 200 typically includes at least some of the computer code involved in performing the inventive methods.

Peripheral Device Set 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

Network module 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

Remote Server 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

Public cloud 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form or virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment and terminology were chosen and described in order to best explain the principles of the invention and the practical application, and to enable others of ordinary skill in the art to understand the invention for various embodiments with various modifications as are suited to the particular use contemplated.

What is claimed is:

1. A method for cleaning a surface of a solar panel comprising:

receiving, at a hardware processor, one or more of: a current power output measure of the solar panel responsive to a solar panel surface exposure to solar energy and a presence of an accumulated substance formed on the solar panel surface, a current weather condition of an environment within which the solar panel is located, and a current image of a surface of the solar panel obtained from an imaging device, the current image of the solar panel surface revealing the presence of an accumulated substance;

running, using the hardware processor, a machine-learned (ML) prediction model, said ML prediction model trained to predict a decrease in power output of the solar panel based on one or more of said received current power output measure, the current weather condition and a solar panel surface image that reveals the presence of the accumulated substance on the solar panel surface;

determining, using the hardware processor, whether a predicted decrease in power output of the solar panel is greater than a pre-determined threshold power decrease;

responsive to a determining that the predicted decrease in power output of the solar panel is greater than the pre-determined threshold power decrease, locating a laser beam generator device proximate the solar panel surface, said laser beam generator device having a laser source for focusing generated laser beams at the solar panel surface;

processing, using said hardware processor, said current image of the solar panel surface to generate a heatmap image showing a distribution of accumulated substances on the solar panel surface;

determining, using said hardware processor, from said heatmap image, a precise location on the solar panel surface of an accumulated substance;

using, by said laser source, said heatmap image to precisely locate said laser beam generator device proximate the solar panel surface;

estimating, using the hardware processor, a power expended by the laser beam generator device in generating said laser beams for said precise removal of the accumulated substance on the solar panel surface;

determining, using the hardware processor, when a power increase of an energy output measure of said solar panel resulting from said precise removal of the accumulated substance on the solar panel surface exceeds said estimated power expended by the laser beam generator device in generating said laser beams for said precise removal of the accumulated substance on the solar panel surface, and in response to said determining, controlling the laser source to generate laser beams for impingement upon the accumulated substance on the solar panel surface to precisely remove the accumulated substance on the solar panel surface and clean the solar panel surface.

2. The method as claimed in claim 1, further comprising:

processing, using said hardware processor, said image of said solar panel surface to determine a type of substance accumulated on the solar panel surface.

3. The method as claimed in claim 1, wherein said locating the laser beam generator device proximate the solar panel surface comprises:

controlling, using the hardware processor, a distance between a laser source of the laser beam generator device and a location of the accumulated substance; and controlling, using the hardware processor, a height of the laser source laser beam generator device above the solar panel surface.

4. The method as claimed in claim 3, wherein said laser beam generator device comprises a telescopic lens through which a generated laser beam is directed from an associated laser source, said method further comprising:

controlling, under control of the hardware processor, a focal length of said telescopic lens to precisely locate generated laser beams to the location of the accumulated substance at the solar panel surface for precise removal of the accumulated substance.

5. A computer-implemented system for cleaning a surface of a solar panel comprising:

one or more computer processors;

one or more non-transitory computer-readable storage media;

program instructions, stored on the one or more non-transitory computer-readable storage media, which when implemented by the one or more processors, cause the computer system to:

receive one or more of: a current power output measure of the solar panel responsive to a solar panel surface exposure to solar energy and a presence of an accumulated substance formed on the solar panel surface, a current weather condition of an environment within which the solar panel is located, and a current image of a surface of the solar panel obtained from an imaging device, the current image of a solar panel surface revealing the presence of the accumulated substance;

run a machine-learned (ML) prediction model, said ML prediction model trained to predict a decrease in power output of the solar panel based on one or more of said received current power output measure, the current weather condition and a solar panel surface image that reveals the presence of the accumulated substance on the solar panel surface;

determine whether a predicted decrease in power output of the solar panel is greater than a pre-determined threshold power decrease; and responsive to a determining that the predicted decrease in power output of the solar panel is greater than the pre-determined threshold power decrease, locate a laser beam generator device proximate the solar panel surface, said laser beam generator device having a laser source for focusing generated laser beams at the solar panel surface;

process said current image of the solar panel surface to generate a heatmap image showing a distribution of accumulated substances on the solar panel surface;

determine, from said heatmap image, a precise location on the solar panel surface of an accumulated substance;

use said heatmap image to precisely locate said laser beam generator device proximate the solar panel surface;

estimate a power expended by the laser beam generator device in generating said laser beams for said precise removal of the accumulated substance on the solar panel surface;

determine when a power increase of an energy output measure of said solar panel resulting from said precise removal of the accumulated substance on the solar panel surface exceeds said estimated power expended by the laser beam generator device in generating said laser beams for said precise removal of the accumulated substance on the solar panel surface, and in response to said determining, generate, by the laser source, laser beams for impingement upon the accumulated substance on the solar panel surface to precisely remove the accumulated substance on the solar panel surface and clean the solar panel surface.

6. The system as claimed in claim 5, wherein said instructions further configure the computer system to:

process said image of said solar panel surface to determine a type of substance accumulated on the solar panel surface.

7. The system as claimed in claim 5, wherein to locate the laser beam generator device proximate the solar panel surface, said instructions further configure the computer system to:

control a distance between a laser source of the laser beam generator device and a location of the accumulated substance; and control a height of the laser source laser beam generator device above the solar panel surface.

8. The system as claimed in claim 7, wherein said laser beam generator device comprises a telescopic lens through which a generated laser beam is directed from an associated laser source, said instructions further configure the computer system to:

control a focal length of said telescopic lens to precisely locate generated laser beams to the location of the accumulated substance at the solar panel surface for precise removal of the accumulated substance.

9. A computer program product for cleaning a solar panel, the computer program product comprising:

one or more computer readable storage media, and program instructions collectively stored on the one or more computer readable storage media, the program instructions comprising:

program instructions to receive one or more of: a current power output measure of the solar panel responsive to a solar panel surface exposure to solar energy and a presence of an accumulated substance formed on the solar panel surface, a current weather condition of an environment within which the solar panel is located, and a current image of a surface of the solar panel obtained from an imaging device, the current image of the solar panel surface revealing the presence of an accumulated substance;

program instructions to run a machine-learned (ML) prediction model, said ML prediction model trained to predict a decrease in power output of the solar panel based on one or more of said received current power output measure, the current weather condition and a solar panel surface image that reveals the presence of the accumulated substance on the solar panel surface;

program instructions to determine whether a predicted decrease in power output of the solar panel is greater than a pre-determined threshold power decrease; and responsive to a determining that the predicted decrease in power output of the solar panel is greater than the pre-determined threshold power decrease, program instructions to locate a laser beam generator device proximate the solar panel surface, said laser beam generator device having a laser source for focusing generated laser beams at the solar panel surface;

program instructions to process said current image of the solar panel surface to generate a heatmap image showing a distribution of accumulated substances on the solar panel surface; and program instructions to determine, from said heatmap image, a precise location on the solar panel surface of an accumulated substance;

program instructions to use said heatmap image to precisely locate said laser beam generator device proximate the solar panel surface;

program instructions to estimate a power expended by the laser beam generator device in generating said laser beams for said precise removal of the accumulated substance on the solar panel surface;

program instructions to estimate a power expended by the laser beam generator device in generating said laser beams for said precise removal of the accumulated substance on the solar panel surface;

program instructions to determine when a power increase of an energy output measure of said solar panel resulting from said precise removal of the accumulated substance on the solar panel surface exceeds said estimated power expended by the laser beam generator device in generating said laser beams for said precise removal of the accumulated substance on the solar panel surface, and in response to said determining, program instructions to generate, by the laser source, laser beams for impingement upon the accumulated substance on the solar panel surface to precisely remove the accumulated substance on the solar panel surface and clean the solar panel surface.

10. The computer program product as claimed in claim 9, wherein to locate the laser beam generator device proximate the solar panel surface, said program instructions further comprise:

program instructions to control a distance between a laser source of the laser beam generator device and a location of the accumulated substance; and program instructions to control a height of the laser source laser beam generator device above the solar panel surface.

11. The computer program product as claimed in claim 10, wherein said laser beam generator device comprises a telescopic lens through which a generated laser beam is directed from an associated laser source, said program instructions further comprising:

program instructions to control a focal length of said telescopic lens to precisely locate generated laser beams to the location of the accumulated substance at the solar panel surface for precise removal of the accumulated substance.

* * * * *